(12) United States Patent
Wang et al.

(10) Patent No.: US 8,423,053 B2
(45) Date of Patent: Apr. 16, 2013

(54) MOBILE TERMINAL NETWORK AND METHOD FOR MOBILE TERMINALS TO RECEIVE TEXT MESSAGES

(75) Inventors: Shengbin Wang, Huizhou (CN); Caixia Wang, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 0 days.

(21) Appl. No.: 13/392,799

(22) PCT Filed: May 18, 2011

(86) PCT No.: PCT/CN2011/074235
§ 371 (c)(1),
(2), (4) Date: Feb. 27, 2012

(87) PCT Pub. No.: WO2012/022178
PCT Pub. Date: Feb. 23, 2012

(65) Prior Publication Data
US 2012/0157130 A1    Jun. 21, 2012

(30) Foreign Application Priority Data

Aug. 18, 2010 (CN) .......................... 2010 1 0261556

(51) Int. Cl.
*H04W 68/00* (2009.01)
(52) U.S. Cl.
USPC ............ 455/458; 455/456.1; 455/456.2; 455/456.3; 455/456.4; 455/456.5; 455/466; 370/352

(58) Field of Classification Search .... 455/456.1–456.5, 455/458, 466; 370/352
See application file for complete search history.

(56) References Cited

U.S. PATENT DOCUMENTS

| | | | | |
|---|---|---|---|---|
| 6,370,390 | B1 * | 4/2002 | Salin et al. | 455/466 |
| 7,043,249 | B2 * | 5/2006 | Sayeedi | 455/445 |
| 7,103,662 | B2 * | 9/2006 | Ray et al. | 709/225 |
| 7,154,868 | B1 * | 12/2006 | Sharma et al. | 370/331 |
| 2003/0016639 | A1 * | 1/2003 | Kransmo et al. | 370/335 |
| 2004/0090951 | A1 * | 5/2004 | Jung | 370/352 |

* cited by examiner

*Primary Examiner* — Charles Shedrick
(74) *Attorney, Agent, or Firm* — Shimokaji & Associates P.C.

(57) ABSTRACT

The present invention relates to a mobile terminal network and a method for mobile terminals to receive text messages, the method comprising a network server pages a mobile terminal and determines whether text messages can be sent; if the mobile terminal is in the Packet Transfer state, it does not respond to the paging by the network server; if the network server does not receive a response from the mobile terminal, it terminates the paging until receiving position update information from the mobile terminal. After updating the position, the mobile terminal sends position update information to the network server; the network server continues to page the mobile terminal so as to take an action to send text messages. When a mobile terminal is switching in the Packet Transfer state, it can receive and send text messages promptly and rapidly, which ensures that users can receive text messages promptly.

17 Claims, 2 Drawing Sheets

MOBILE TERMINAL NETWORK AND METHOD FOR MOBILE TERMINALS TO RECEIVE TEXT MESSAGES

FIELD OF THE INVENTION

The present invention relates to mobile terminal technologies and more specifically, to a mobile terminal network and a method for mobile terminals to receive text messages.

DESCRIPTION OF THE RELATED ART

Along with the continuous development of mobile terminal technologies, users are imposing higher and higher requirements on mobile terminal functions.

Regarding cell phones, for example, there are Global System for Mobile Communications (GSM) and General Packet Radio Service (GPRS) networks. Class B cell phones cannot have both GSM service and GPRS service simultaneously. GSM service has higher priority in operations. A network locates corresponding mobile terminals through broadcasting paging messages. After comparison and authentication, a mobile terminal responds with a Paging Response message if a paging message is determined to be for itself. In case of a GSM paging while a mobile station is performing GPRS service, it will suspend the GPRS service, carry out the GSM service first, and then restore the GPRS service. Text message service is also one of the GSM services, which has higher priority than GPRS services do.

Baseband chips have limited capabilities in the prior art. When a cell phone is in the Packet Transfer state, therefore, it is unable to receive paging by Common Control Channel (CCCH) in the circuit switch domain (CS domain) and meanwhile, it is unable to decode Packet Paging Channel in the packet switch domain (PS domain). If a network pages the cell phone at this time, the cell phone does not respond. The network concludes that the cell phone is not accessible and stops paging the cell phone. When the cell phone exits the Packet Transfer state, the network will not re-page the cell phone since the cell phone does not report its position information to the network, leading to delays of text message reception. It will end only when the mobile terminal performs periodic position update, which might be several hours later. As a result, the reception of text messages by users will be delayed and the users will be affected.

Methods to promptly and rapidly receive and send text messages when a mobile terminal is switching in the Packet Transfer state is one of the research directions in the field of mobile terminal technologies.

SUMMARY OF THE INVENTION

An object of the present invention is to provide a method for mobile terminals to receive text messages so as to promptly and rapidly receive and send text messages when a mobile terminal is switching in the Packet Transfer state.

According to one aspect of the present invention, a method for mobile terminals to receive text messages comprises paging a mobile terminal by a network server to determine whether text messages can be sent; if said mobile terminal is in the Packet Transfer state, the mobile terminal does not respond to the paging by said network server; if said network server does not receive a response from said mobile terminal, the network server terminates the paging until receiving position update information from said mobile terminal; after updating the position update information, said mobile terminal sends the position update information to said network server; and said network server continues to page said mobile terminal according to the position update information of said mobile terminal so as to take an action to send text messages.

According to a further aspect of the present invention, a mobile terminal network comprises a network server; and at least one mobile terminal, wherein the network server is adapted to page a mobile terminal and determine whether text messages can be sent, if said mobile terminal is in a Packet Transfer state, the mobile terminal does not respond to the paging by said network server; if said network server does not receive a response from said mobile terminal, the network server terminates the paging until receiving position update information from said mobile terminal; and after updating the position, said mobile terminal sends position update information to said network server; said network server continues to page said mobile terminal according to the position update information of said mobile terminal so as to take an action to send text messages.

According to another aspect of the present invention, a method for determining whether text messages can be sent to the mobile terminal comprises paging a mobile terminal by a network server; sending no response to the page from the mobile terminal to the network server when the mobile terminal is in a Packet Transfer state; terminating the paging of the mobile terminal until receiving position update information from the mobile terminal; sending position update information to the network server from the mobile terminal; paging the mobile terminal from the network server according to the position update information; and responding by the mobile terminal to the paging by the network server and receiving text messages sent to the mobile terminal by the network server.

DETAILED DESCRIPTION OF A PREFERRED EMBODIMENT

To make the objects, technology and advantages of the present invention more clearly understood, the present invention is further described in detail below with reference to the accompanying drawings and an embodiment. It should be understood that the specific embodiment described herein is only intended to explain the present invention, not to limit the present invention.

Figure 1:
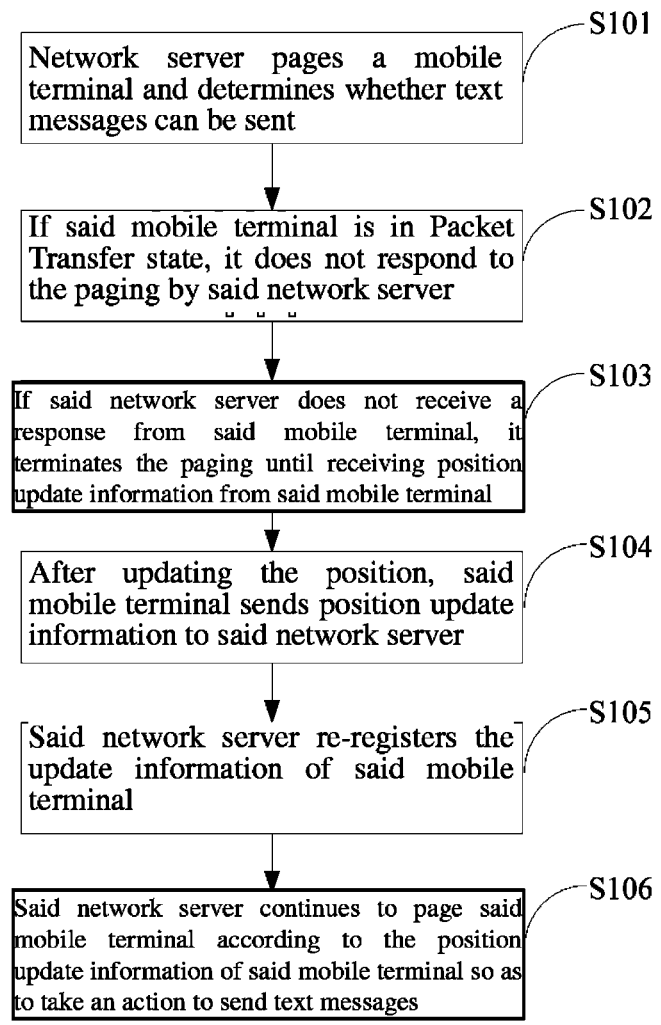
FIG. 1 is a flow chart of the method for mobile terminals to receive text messages according to an embodiment of the present invention.

FIG. 1 illustrates the flow of the method for mobile terminals to receive text messages according to an embodiment of the present invention.

In Step S101, a network server pages a mobile terminal and determines whether text messages can be sent. When the network server pages a mobile terminal, it pages the GSM of the mobile terminal.

In Step S102, if the mobile terminal is in the Packet Transfer state, it does not respond to the paging by the network server.

In Step S103, if the network server does not receive a response from the mobile terminal, it terminates the paging until receiving position update information from the mobile terminal.

In Step S104, after updating the position update information, the mobile terminal sends the position update information to the network server.

In Step S105, the network server re-registers the update information of the mobile terminal.

In Step S106, the network server continues to page the mobile terminal according to the position update information of the mobile terminal so as to take an action to send text messages.

In Step S107, the mobile terminal responds to the paging by the network server and receives text messages sent by the network server.

Figure 2:
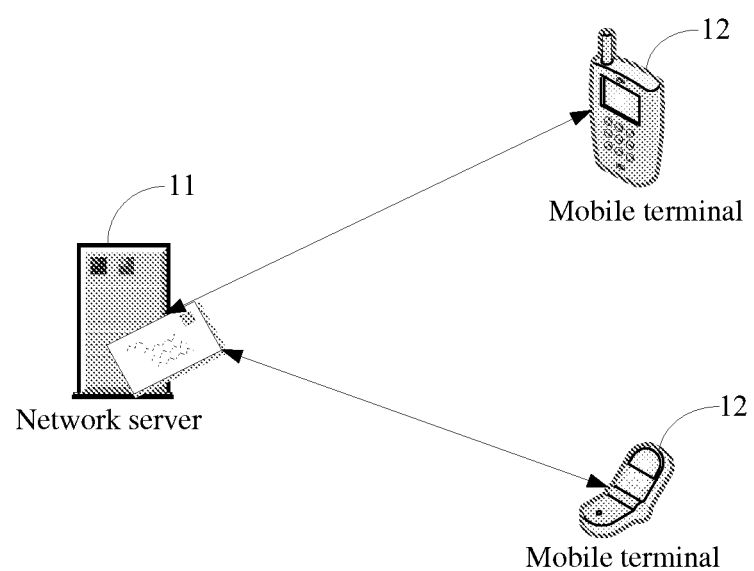
FIG. 2 illustrates the structure of the mobile terminal network according to an embodiment of the present invention.

FIG. 2 illustrates the structure of the mobile terminal network according to an embodiment of the present invention.

The mobile terminal network comprises a network server 11 and at least one mobile terminal 12, the network server 11 pages the mobile terminal 12 and determines whether text messages can be sent. If the mobile terminal 12 is in the Packet Transfer state, it does not respond to the paging by the network server 11.

When the network server 11 pages the mobile terminal 12, it pages the GSM of the mobile terminal.

If the network server 11 does not receive a response from the mobile terminal, it terminates the paging until receiving position update information from the mobile terminal 12.

After updating the position, the mobile terminal 12 sends position update information to said network server 11; after the mobile terminal 12 sends the position update information to the network server 11, the network server 11 re-registers the update information of the mobile terminal 12.

The network server 11 continues to page the mobile terminal 12 according to the position update information so as to take an action to send text messages. After the network server 11 continues to page the mobile terminal 12 according to the position update information, the mobile terminal 12 responds to the paging by the network server 11 and receives text messages sent by the network server 11.

According to an embodiment of the present invention, if a mobile terminal is in the Packet Transfer state, the network server stops paging the mobile terminal until receiving position update information from the mobile terminal, and then pages the mobile terminal according to the new position information so as to send text messages. When a mobile terminal is switching in the Packet Transfer state, it can receive and send text messages promptly and rapidly, which ensures that users can receive text messages promptly and facilitates the promotion of the mobile terminals.

It should be understood that those skilled in the art may make improvements or modifications according to the above description, while all these improvements and modifications shall be encompassed by the claims of the present invention.

What is claimed is:

1. A method for mobile terminals to receive text messages, comprising:

paging a mobile terminal by a network server to determine whether text messages can be sent wherein when said network server pages the mobile terminal, it pages an entire network of said mobile terminal;

responding to the paging by said network server, unless said mobile terminal is in a packet transfer state, and receiving text messages sent by said network server to said mobile terminal during switching in and out of the packet transfer state;

checking for position update information from said mobile terminal and terminating the paging in response to said network server not receiving a response from said mobile terminal;

sending the position update from the mobile terminal information from said mobile terminal to said network server after updating the position update information;

re-registering the update information of said mobile terminal by said network server; and continuing to page said mobile terminal according to the position update information of said mobile terminal so as to take an action to send text messages.

2. The method for mobile terminals to receive text messages as set forth in claim 1, wherein when said network server pages a mobile terminal, it pages the a network connected to said mobile terminal.

3. The method for mobile terminals to receive text messages as set forth in claim 1, further comprising switching in the Packet Transfer state to receive and send text messages promptly.

4. A mobile terminal network comprising:

a network server; and at least one mobile terminal, wherein:

the network server is adapted to page a mobile terminal and determine whether text messages can be sent, if said mobile terminal is in a packet transfer state, the mobile terminal does not respond to the paging by said network server and the mobile terminal responds to the paging from said network server during switching to and from the packet transfer state;

if said network server does not receive a response from said mobile terminal, the network server terminates the paging until receiving position update information from said mobile terminal; and after updating the position, said mobile terminal sends position update information to said network server; said network server continues to page said mobile terminal according to the position update information of said mobile terminal so as to take an action to send text messages.

5. The mobile terminal network as set forth in claim 4, wherein, after said network server continues to page said mobile terminal according to the position update information of said mobile terminal, the mobile terminal responds to the paging by said network server and receives text messages sent by said network server.

6. The mobile terminal network as set forth in claim 4, after said mobile terminal sends the position update information to said network server, said network server re-registers the update information of said mobile terminal.

7. The mobile terminal network as set forth in claim 4, wherein when said network server pages a mobile terminal, it pages the a network connected to said mobile terminal.

8. The method for mobile terminals to receive text messages as set forth in claim 1, wherein the mobile terminal is a mobile phone.

9. The mobile terminal network as set forth in claim 4, wherein the mobile terminal is a mobile phone.

10. The mobile terminal network as set forth in claim 4, wherein the mobile terminal is adapted to receive text messages with in a packet transfer state.

11. A method for determining whether text messages can be sent to the mobile terminal, comprising:

paging a mobile terminal by a network server;

responding to the paging by said network server, unless said mobile terminal is in a packet transfer state;

receiving text messages sent by said network server to said mobile terminal during switching in and out of the packet transfer state; and terminating the paging of the mobile terminal until receiving position update information from the mobile terminal.

12. The method as set forth in claim 11, further comprising sending position update information to the network server from the mobile terminal.

13. The method as set forth in claim 12, further comprising paging the mobile terminal from the network server according to the position update information.

14. The method as set forth in claim 13, further comprising responding by the mobile terminal to the paging by the network server and receiving text messages sent to the mobile terminal by the network server.

15. The method as set forth in claim 14, wherein the paging is a GSM page.

16. The method as set forth in claim 14, further comprising re-registering the position update information of said mobile terminal by said network server.

17. The method as set forth in claim 11, wherein the mobile terminal is a mobile phone.

\* \* \* \* \*